Patented July 7, 1936

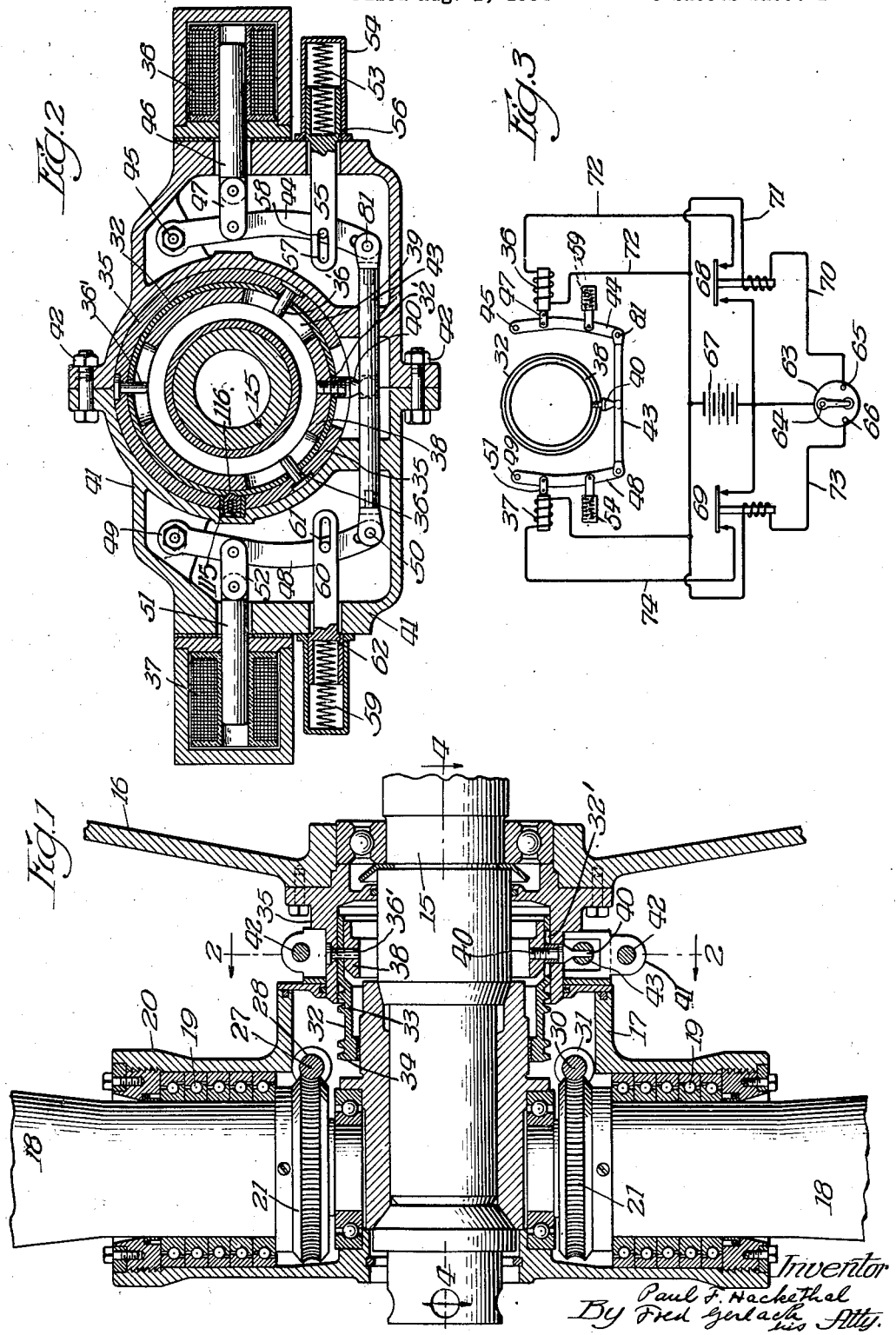

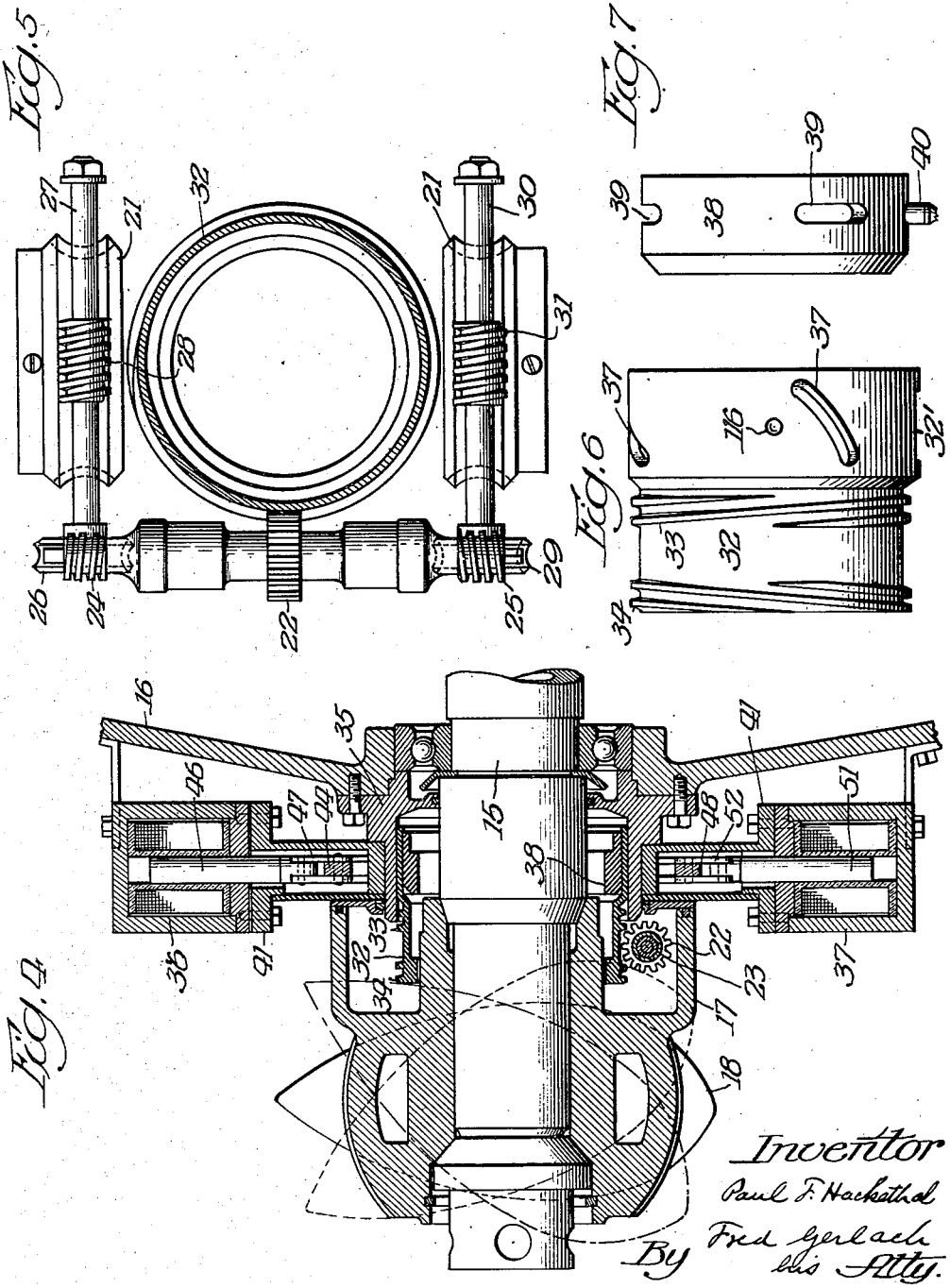

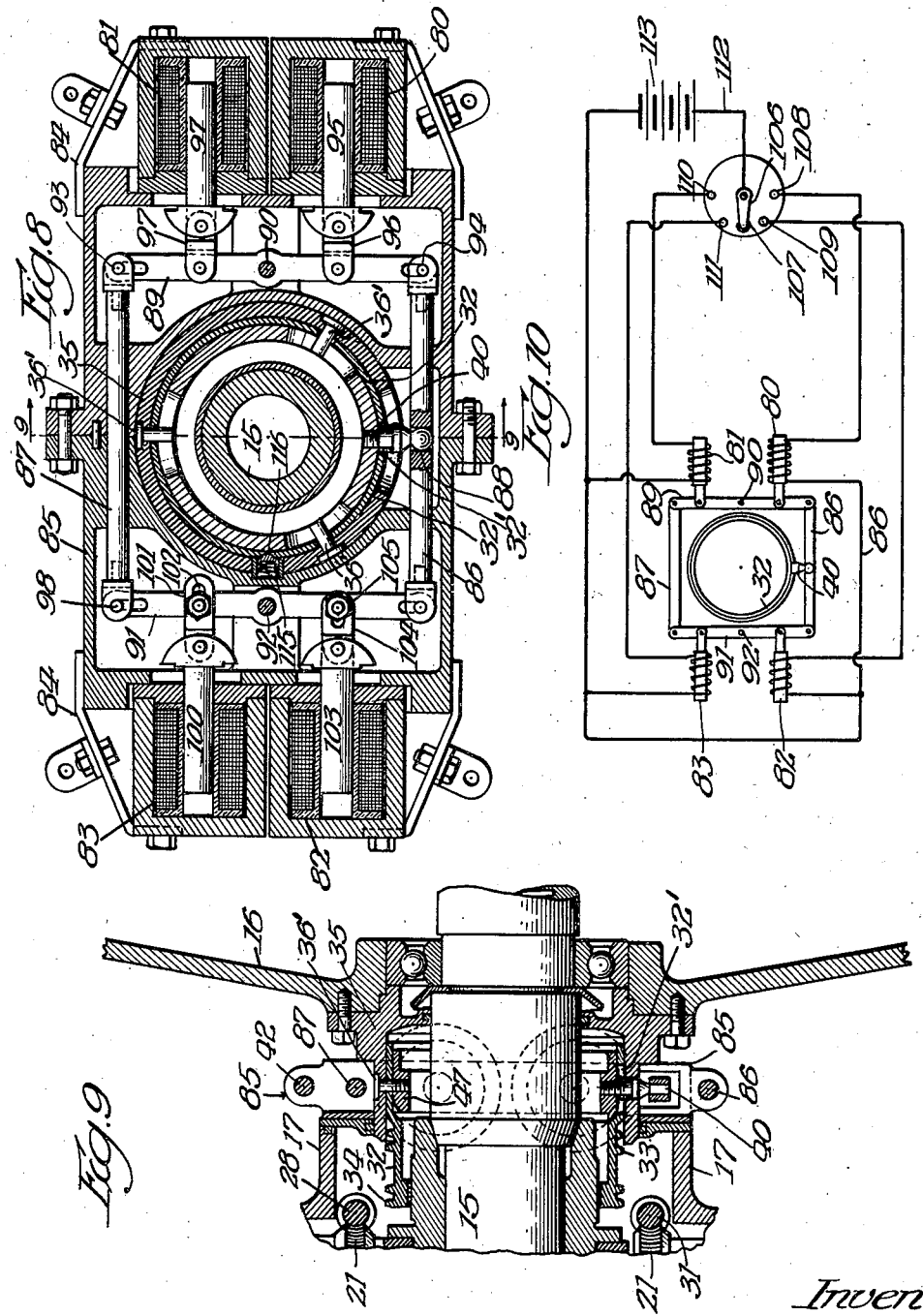

2,046,625

UNITED STATES PATENT OFFICE 2,046,625

CONTROLLABLE PROPELLER

Paul F. Hackethal, Williamsport, Pa., assignor, by mesne assignments, to Aviation Manufacturing Corporation, Chicago, Ill., a corporation of Delaware Application August 1, 1934, Serial No. 737,870

17 Claims. (Cl. 170—163)

The invention relates to adjustable propellers. In aircraft propellers it is advantageous to adjust the propeller blades, usually by a variation of their pitch, to cause them to operate differentially under different conditions, such as on the take-off, normal flying, and landing. In the type of controllable pitch propeller in which the pitch of the blades is effected by power and high ratio reduction gearing various forms of mechanical devices, shiftable by the pilot, have been used for engaging the gearing when a pitch change is to be effected. Such devices included a system of rods, bell-cranks or flexible shafts, which were influenced by deflection in the aircraft structure upon which they are mounted.

One object of the invention is to provide improved electromagnetically operated means for engaging the elements of the blade adjusting gearing, which will avoid the weight, cost and friction of the mechanical control and the disturbances in operation caused by deflections in the aircraft structure. This object is attained primarily by the use of electromagnetic means for engaging the gearing to adjust the blades. By providing electromagnetic means for shifting the coupling and uncoupling member for this gearing to control the pitch changes, the weight, cost and friction of and the resultant deflection in a mechanical control, such as a system of rods and bell-cranks or a flexible shaft, are avoided.

Another object of the invention is to provide electromagnetically controlled means for adjusting the propeller blades which can be easily installed and maintained.

Another object of the invention is to provide separate electromagnetic means for engaging and disengaging the gearing.

Other objects of the invention will appear from the detailed description.

The invention consists in the several novel features and combinations hereinafter set forth and more particularly defined by claims at the conclusion hereof.

In the drawings:

Fig. 1 is an axial section through a propeller embodying the invention.

Fig. 2 is a section taken on line 2—2 of Fig. 1.

Fig. 3 is a diagram of the electrical connections and devices for controlling the form of the invention illustrated in Figs. 1 and 2.

Fig. 4 is a section on line 4—4 of Fig. 1.

Fig. 5 is a diagrammatic view of the gearing for varying the pitch of the propeller blades.

Fig. 6 is a view of the collar for engaging the gearing to adjust the propeller blades.

Fig. 7 is a detail of the internal shifting ring for the collar.

Fig. 8 is a transverse section of another form of the invention.

Fig. 9 is a section on line 9—9 of Fig. 8.

Fig. 10 is a diagram of the electrical connections and devices for controlling the mechanism shown in Figs. 8 and 9.

The invention is illustrated, by way of example, as applied to aircraft comprising a propeller shaft 15, which may be the engine shaft, and journaled in the engine frame 16; a propeller hub 17 fixed to rotate with shaft 15; propeller blades 18 mounted in anti-friction bearings 19, for rotation on their own axes and pitch adjustment in radial sleeves 20 integral with the hub 17; and a worm gear 21 fixed to each propeller blade 18. The mechanism for adjusting the blades is adapted to be driven by power derived from the rotation of the propeller shaft, and comprises a toothed gear 22 (Fig. 4), worm wheels 24 and 25 adapted to be driven by gear 22, a worm gear 26 engaged by the worm 24, a shaft 27 fixed to gear 26, a worm 28 meshing with worm gear 21 on one of the propeller blades, a gear 29 engaged by worm 25, a shaft 30 fixed to gear 29, and a worm 31 on shaft 30 meshing with worm gear 21 on the other propeller blade 18. Worms 24 and 25 rotate the blades in opposite directions. Through this gearing the speed reduction desirable for slowly and accurately adjusting the blades to the desired pitch is attained. All of this gearing normally is stationary in, rotates unitarily with the hub, and is uncoupled from the driving means at gear 22. The means for operating the pitch change gearing in the hub is exemplified by a collar 32 provided with a right-hand screw or worm 33 engageable with the gear 22 to rotate the gearing in one direction to increase the pitch of the blades, and a left-hand worm 34 engageable with the gear 22 to drive the reduction gearing in the opposite direction to decrease the pitch of the blades. Collar 32 is slidably and rotatably mounted in a sleeve 35 fixed to the front of the engine frame or casing 16. Pins 36¹, which are fixed in sleeve 35, extend through helical slots 37 in the collar 32. A ring 38 is internally mounted in collar 32, is rotatable therein, and is held against longitudinal movement by pins 36¹ which extend into circumferential slots 39 in the ring. A shifter-arm or stud 40 is fixed to ring 38 and extends through a longitudinal slot 32¹ in collar 32. When arm 40 is shifted in one direction, it will rotate collar 32 and ring 38 and helical slots 37 will move the collar longitudinally from its neutral position, and when the arm 40 is shifted in the opposite direction, the same means will shift the collar 32 longitudinally in the opposite direction. By this means the collar may be shifted from its neutral position to bring either of the worms 33, 34 into mesh with gear 22 or back to neutral position.

Normally collar 32 is positioned so the adjacent peripheral portion of gear 22 is between and disengaged from worms 33, 34. When collar 32 is shifted forwardly, worm 33 will engage the gear 22 and rotate said gear to operate the gearing mounted in the hub to increase the pitch of both of the blades as the result of the rotation around the collar of the hub and gearing carried thereby. When the collar 32 is shifted inwardly from its neutral position, worm 34 will engage gear 22 and drive the reduction gearing to decrease the pitch of the blades. This exemplifies a device for engaging and driving the power operable gearing carried by the hub for adjusting the blades.

In this form of the invention (Figs. 1, 2 and 3) the electromagnetic means for shifting the collar 32 to effect pitch changes comprises a solenoid magnet 36 for shifting collar 32 into pitch-increasing position, and a solenoid magnet 37 for shifting said collar into pitch-decreasing position. The housings of these magnets are fixedly secured to and on opposite sides of a casing 41 which is mounted and fixed on sleeve 35, in which the collar 32 is mounted. Casing 41 is formed of sections meeting in an axial plane for convenience in mounting and demounting control means for said collar contained therein and bolts 42 secure the sections together.

A rod 43 is slidably mounted in two-part casing 41 and the stud or arm 40 extends into a slot in said rod. Endwise movement of the rod will rotate ring 38. A lever 44, fulcrumed at 45 in casing 41, has its lower end pivotally connected at 81, to one end of rod 43. The armature 46 of magnet 36 is connected by a link 47 to lever 44. A lever 48, fulcrumed at 49 in casing 41, has its lower end pivotally connected at 50 to the other end of rod 43. The armature 51 of magnet 37 is connected by a link 52 to lever 48. A spring 53, confined in housing 54, is applied to press a stem 55 inwardly. This stem has a shoulder 56 to limit its inward movement and a slot 57 for a pin 58 on lever 44 which permits said lever and rod 43 to be independently shifted by the magnet 37 and armature 51. Spring 53 shifts lever 44 and rod 43 to neutral position when magnet 36 is deenergized at the end of a pitch-increasing operation. A spring 59 is applied to lever 48 through a stem 60 having a slot and pin connection 61 with said lever to retract lever 48 and rod 43 to neutral position when magnet 37 is deenergized at the end of a pitch-decreasing operation. Stem 60 has a shoulder 62 which engages the frame 41 to arrest the stem when it has shifted lever 48 to its neutral position. The slot in the stem 60 permits the magnet 36 for shifting the collar 32 to pitch-increasing position, to move the levers 44, 48 and rod 43 independently of spring 59 from neutral position to operative position.

The electrical connections for controlling magnets 36, 37 include a battery, or other suitable source of potential 67, a switch 63 which is mounted within convenient reach of the pilot and provided with a contact arm 64 and contacts 65, 66 adapted to be engaged by said arm, and relay switches 68 and 69 connected as indicated in Fig. 3.

The operation will be as follows: In normal flight, and while the blades are adjusted to the desired pitch, the collar 32 will be in its neutral position and disengaged from the gear 22. The connections between the electromagnets and the collar shifting arm 46 will then be in the position shown in Fig. 2. The contact arm 64 will then be disengaged from both contacts 65, 66. To increase the pitch of the blades, the pilot will shift the contact arm 64 to engage contact 65, which will establish a circuit from battery 67 through arm 64, contact 65, the magnet of switch 68, and conductor 71, and close said switch. This will establish a circuit from battery 67 through conductor 72 in which magnet 36 is included. Armature 46 will then be shifted outwardly to swing lever 44 and shift rod 43 in one direction. The outer end of the collar shifter arm 40, being confined in a slot in hub 43, will be shifted in one direction to operate the collar 32 to cause worm 33 to engage gear 22. Blades 18 will be adjusted to increase their pitch by the gearing between gear 22 and the blades. When the blades have been adjusted to the desired degree, the pilot will shift the contact arm 64 off contact 65. This will open the circuit for magnet 36 at switch 68 and deenergize said magnet. The spring 53 will then restore the lever 44, rod 43, arm 40 and collar 32 to their neutral position, thus stopping the further increase of the pitch of the blades. To decrease the pitch of the blades, the pilot will engage arm 64 and contact 66 to establish a circuit from battery 67, arm 64, contact 66, conductor 73 and the helix of relay switch 69. This will close a circuit from battery 67 through conductor 74 in which the helix of magnet 37 is included, and the contacts of relay switch 67. Armature 51 will then be shifted outwardly to swing lever 48 and shift rod 43 in one direction. This movement of rod 43 will shift arm 40 to operate the collar 32 to bring worm 34 into engagement with gear 22. Blades 18 will then be adjusted to decrease their pitch by the gearing between gear 22 and the blades. When the blades have been adjusted to the desired degree, the pilot will move contact arm 44 off contact 66 to open the circuit for magnet 37 at the relay switch 69 and deenergize said magnet. Spring 53 will then restore the lever 44, rod 43, arm 40 and collar 32 to their neutral position, thus stopping further decrease of the pitch of the blades.

In the form of the invention illustrated in Figs. 8 and 9, the mechanism for shifting the collar 32 is operated by electromagnets to shift the collar into neutral position, as well as operative position, thus dispensing with the retracting springs. This mechanism comprises a solenoid magnet 80 for shifting the collar 32 into pitch-increasing position, a solenoid magnet 81 for shifting said collar into pitch-decreasing position, a solenoid magnet 82 for shifting the collar from pitch-increasing to neutral position, and a solenoid magnet 83 for shifting the collar from pitch-decreasing to neutral position. The housings of these magnets are fixedly secured by brackets 84 to the casing 85 which is mounted and fixed on the fixed sleeve 35, in which the collar 32 is mounted, as previously described. This casing is formed in sections meeting in an axial plane and secured by bolts for convenience in mounting and dismounting. A pair of rods 86 and 87 are slidably mounted in the casing 85 above and below the sleeve 35. Rod 86 has a central socket 88, in which is confined the distal end of the arm or stud 40 which is fixedly secured in ring 38, to operate collar 32 as previously described. Rods 86 and 87 are connected at one side of casing 85 to a lever 89 which is centrally fulcrumed at 90 in casing 85 and at the other side to a lever 91 which is centrally fulcrumed at 92 in said casing. Lever 89 is pivotally connected by a pin and slot connection 93 with rod 87 and by a pin and slot connection 94 with one end of the rod 86, so that arm 40 will be shifted responsively to the actuations of either of the magnets 80, 81. The armature 95 of magnet 80 is connected by a link 96 to the lever 89 and the armature 97 of the magnet 81 is similarly connected by a link 97 to said lever These links are on opposite sides of the fulcrum 90, so that the attraction of the armatures 95, 97 will operate lever 89 and rod 86 in opposite directions. Lever 91 has one of its ends connected by a pin and slot connection 98 to one end of the rod 87 and its opposite end similarly connected at 99 to the rod 86. Above the fulcrum 92 armature 100 of magnet 83 is connected to lever 48 by a link 101 which has its inner end connected by a pin and slot 102. Below fulcrum 92 armature 103 is similarly connected by a link 104 and by a pin and slot connection 105 to lever 91.

Means for controlling the operation of the magnets 80, 81, 82 and 83 comprises a switch 106 mounted within convenient reach of the pilot and provided with a contact arm 107 and contacts 108, 109, 110 and 111; a conductor 112 connected to a battery or other suitable source of potential 113; and electric conductors as shown. These devices and connections exemplify means whereby the pilot may selectively cause the energizing of the electric magnets to control the movements of the collar 32 by which the blades are adjusted.

The operation of the mechanism shown in Figs. 8 and 9 will be as follows: Normally the collar 32 will be in its neutral position and disengaged from the gear 22 and the electromagnets and the collar shifting arm 40 will be in the position shown in Fig. 8 and switch arm 106 will open. To increase the pitch of the blades, the pilot will shift contact arm 107 to engage contact 108, which will establish a circuit from battery 113 through conductor 112, arm 107, contact 108 and magnet 80, to shift armature 95 outwardly and swing lever 89, and shift rod 86 and arm 40 in one direction. Arm 40 will shift collar 32 into pitch-increasing position. When the blades have been adjusted the desired degree, the pilot will shift contact arm 107 off contact 108 and onto contact 109. This will deenergize the magnet 80 and establish a circuit to energize magnet 82. Armature 103 will be attracted and shift lever 91, rod 86 and arm 40 to shift the collar 32 into neutral position and disengage it from the gear 22, thus stopping the further increase of the pitch of the blades. To decrease the pitch of the blades, the pilot will shift arm 107 onto contact 110 to establish a circuit from battery 113 through the helix of magnet 81. This will attract armature 97 and shift lever 89, rod 86, and arm 40 to move collar 32 from its neutral to its pitch-decreasing position by engaging worm 34 with gear 22. The pitch of the blades will be decreased through the operation of gear 22 by worm 34. When the pitch of the blades has been decreased to the desired degree, the pilot will shift arm 107 off contact 110, which will deenergize magnet 97 and onto contact 111, which will establish a circuit from battery 113 to energize magnet 83. Armature 100 of magnet 83 will be attracted and shift lever 91 to return rod 86, arm 40, and collar 32 into neutral position. The lost motion permitted by the slots in links 101, 104 allows the magnets 97, 95 to move the collar-shifting mechanism from neutral to pitch-changing positions without shifting the armatures 100, 103 of magnets 83, 82. A spring-detent 115 is mounted in the fixed sleeve 35 to enter a bevelled recess 116 in collar 32 to yieldingly hold the collar in its neutral position.

The invention exemplifies a propeller comprising mechanism for adjusting the blades, which is operable by power derived from the propeller shaft or engine, and electro-magnetic means for controlling the operation of said mechanism, which can be installed in close relation to the blade and hub, and which can be easily mounted and demounted for repair or inspection, and dispenses with mechanical connections between the pilot's cab and the controlling member which renders the gearing operative to adjust the blades.

While the invention has been illustrated and described in connection with the construction of adjusting mechanism exhibited in patent to Smith No. 1,886,602, it is to be understood that it is applicable to others.

The invention is not to be understood as limited to the details set forth, since these may be varied within the scope of the appended claims, without departing from the spirit and scope of the invention.

Having thus described the invention, what I claim as new and desire to secure by Letters Patent is:

1. In a controllable pitch propeller, the combination of a shaft, a hub on the shaft, blades mounted in the hub for pitch changes, gearing mounted in the hub for rotating the blades to change their pitch, a shiftable member around the shaft for engaging the gearing, electromagnetic means for shifting the member into different positions to engage and drive the gearing in opposite directions, and electromagnetic means for disengaging said member.

2. In a controllable pitch propeller, the combination of an engine casing, a shaft, a hub on the shaft, blades adjustably mounted in the hub, gearing mounted in the hub for adjusting the blades in opposite directions, a shiftable device for operating the gearing in opposite directions, and means for shifting said device comprising an electromagnet for shifting said device to drive the gearing in one direction, and an electromagnet for shifting the device to drive said mechanism in the opposite direction, said magnet being mounted between the hub and the casing.

3. In a controllable pitch propeller, the combination of an engine casing, a shaft, a hub on the shaft, blades adjustably mounted in the hub, gearing mounted in the hub for adjusting the blades in opposite directions, a device for operating the gearing in opposite directions, means for shifting said device, comprising an electromagnet for shifting said device to drive the gearing in one direction, and an electromagnet for shifting the device to drive said mechanism in the opposite direction, spring means for shifting the device to its inoperative position, and a support for said shifting means supported by the casing inwardly of the hub and on the outside of the casing.

4. In a controllable pitch propeller, the combination of a shaft, a hub on the shaft, blades rotatably mounted in the hub, gearing mounted in the hub for adjusting the blades, a shiftable annular member around the shaft for operating said gearing, a fixed structure on which said annular member is supported, a pair of electromagnets, a shifting connection between the magnets and said annular member to control the operation of said gearing, and a casing for said connection adjacent to and inwardly of the hub, and mounted on and carried by said fixed structure.

5. In a controllable pitch propeller, the combination of a shaft, a hub on the shaft, blades rotatably mounted in the hub, gearing mounted in the hub for adjusting the blades for pitch variation, a shiftable annular member around the shaft for operating said gearing, a fixed structure by which said annular member is supported, electromagnetic means for shifting said annular member to control the operation of said gearing, and a sectional support adjacent the hub for said electromagnetic means removably mounted on and carried by said fixed structure and disposed around the shaft.

6. In a controllable pitch propeller, the combination of a hub, blades rotatably mounted in the hub, gearing mounted in the hub for adjusting the blades, an annular member for engaging and operating said gearing, a fixed structure by which said annular member is supported, a pair of electromagnets disposed at opposite sides of said member for shifting said annular member to engage the gearing, and shifting means between the magnets and the annular member comprising a member movable longitudinally by the magnets and a pivotal connection between said members, said electromagnets and shifting means being supported by said fixed structure.

7. In a controllable pitch propeller, the combination of a hub on the shaft, blades adjustably mounted in the hub, mechanism mounted in the hub for adjusting the pitch of the blades, a shiftable device for engaging and driving said mechanism, and means for shifting said device in opposite directions comprising a pair of electromagnets and a pair of pivoted levers operable by the magnets, respectively.

8. In a controllable pitch propeller, the combination of a hub on the shaft, blades adjustably mounted in the hub, mechanism mounted in the hub for adjusting the pitch of the blades, a shiftable device for operating said mechanism, and means for shifting said device to operate said mechanism comprising a pair of electromagnets and a pair of pivoted levers, operable by the magnets, respectively, and a connecting rod between the levers.

9. In a controllable pitch propeller, the combination of a hub on the shaft, blades adjustably mounted in the hub, mechanism mounted in the hub for adjusting the pitch of the blades, a device for operating said mechanism, shiftable into and out of engagement with said mechanism, a fixed structure adjacent the hub, and means mounted on the structure for shifting said device, comprising a pair of electromagnets, a pair of pivoted levers operable by the magnets, respectively, and a connection between said levers and said device.

10. In a controllable pitch propeller, the combination of a hub on the shaft, blades adjustably mounted in the hub, mechanism mounted in the hub for adjusting the pitch of the blades, a device around the shaft for operating said mechanism, shiftable into and out of operative position, and means for shifting said device comprising a pair of electromagnets, a pair of pivoted levers, operable by the magnets, respectively, a rod connecting the levers, and an operating connection between the rod and said device.

11. In a controllable pitch propeller, the combination of a hub on the shaft, blades adjustably mounted in the hub, mechanism mounted in the hub for adjusting the pitch of the blades, a device for operating said mechanism, shiftable to engage the mechanism, means for shifting said device comprising a pair of levers and a pair of electromagnets for shifting said levers, respectively, for shifting the device to engage the gearing, and a pair of electromagnets for shifting the levers to shift the device to disengage the gearing.

12. In a controllable pitch propeller, the combination of a shaft, a hub on the shaft, blades adjustably mounted in the hub, mechanism mounted in the hub for adjusting the pitch of the blades, a shiftable device for operating said mechanism, means for shifting said device comprising a pair of centrally pivoted levers, electromagnets for shifting said rods between the ends of the levers, respectively.

13. In controllable pitch propeller, the combination of a shaft, a hub on the shaft, blades adjustably mounted in the hub, mechanism mounted in the hub for adjusting the pitch of the blades, a shiftable device for controlling and operating said mechanism, means for shifting said device comprising a pair of electromagnets, and a pair of levers operable by the magnets, respectively, and means having a lost-motion connection with the levers for shifting the device into its inoperative position.

14. In a controllable pitch propeller, the combination of a hub on the shaft, blades adjustably mounted in the hub, mechanism mounted in the hub for adjusting the pitch of the blades, a gear for operating said mechanism, shiftable into and out of operative position, means for shifting said gear comprising a pair of electromagnets, a pair of levers operable by the magnets, respectively, for shifting the gear into operative position, and electromagnets having lost-motion connections with the levers, for shifting the gear into inoperative position.

15. In a controllable pitch propeller, the combination of a shaft, a fixed support, a hub on the shaft, variable pitch blades mounted in the hub, gearing mounted in the hub for rotating the blades to change their pitch, comprising engageable and disengageable gears, a pair of electromagnets, means operable by the magnets for shifting said member, and a housing for said means and for supporting said electromagnets demountably secured on said support.

16. In a controllable pitch propeller, the combination of a shaft, a fixed support, a hub on the shaft, variable pitch blades mounted in the hub, gearing mounted in the hub for rotating the blades to change their pitch, comprising engageable and disengageable gears, a pair of electromagnets, means operable by the magnets for shifting said member, and a housing for said means for supporting said electromagnets demountably secured on and extending around said support.

17. In a controllable pitch propeller, the combination of a shaft, a fixed support, a hub on the shaft, variable pitch blades mounted in the hub, gearing mounted in the hub for rotating the blades to change their pitch, comprising engageable and disengageable gears, a pair of electromagnets, means operable by the magnets for shifting said member, and a housing formed of sections for said means and supporting said electromagnets demountably secured on said support.

PAUL F. HACKETHAL.